United States Patent
Seddigi et al.

(10) Patent No.: US 9,403,696 B2
(45) Date of Patent: *Aug. 2, 2016

(54) METHOD OF PHOTOCATALYTIC DEGRADATION OF CONTAMINANT IN WATER USING VISIBLE LIGHT SOURCE

(71) Applicant: Umm Al-Qura University, Makkah (SA)

(72) Inventors: Zaki S Seddigi, Makkah (SA); Saleh A Saleh, Makkah (EG); Shahid P Ansari, Makkah (SA)

(73) Assignee: Umm-Al-Qura University, Makkah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,140

(22) Filed: Mar. 2, 2015

(65) Prior Publication Data
US 2015/0166367 A1 Jun. 18, 2015

Related U.S. Application Data

(63) Continuation-in-part of application No. 13/949,662, filed on Jul. 24, 2013, now Pat. No. 9,283,546, and a continuation-in-part of application No. 13/950,084, filed on Jul. 24, 2013, now Pat. No. 9,101,913, and a continuation of application No. PCT/IB2014/001739, filed on Apr. 1, 2014.

(51) Int. Cl.
| | |
|---|---|
| C02F 1/30 | (2006.01) |
| B01J 37/04 | (2006.01) |
| B01J 23/06 | (2006.01) |
| C01G 9/02 | (2006.01) |
| B01J 35/00 | (2006.01) |
| C02F 1/32 | (2006.01) |
| C02F 101/34 | (2006.01) |
| B01J 37/03 | (2006.01) |

(52) U.S. Cl.
CPC . *C02F 1/30* (2013.01); *B01J 23/06* (2013.01); *B01J 35/002* (2013.01); *B01J 35/004* (2013.01); *C01G 9/02* (2013.01); *B01J 35/0013* (2013.01); *B01J 37/031* (2013.01); *C02F 1/32* (2013.01); *C02F 2101/34* (2013.01); *C02F 2305/10* (2013.01); *Y10T 436/20* (2015.01); *Y10T 436/200833* (2015.01)

(58) Field of Classification Search
CPC ............... Y10T 436/20; Y10T 436/00; Y10T 436/200833; C02F 1/00; C02F 1/30; B01J 23/60; B01J 23/00; B01J 23/44; B01J 35/002; B01J 35/004; B01J 37/06; B01J 37/04; B01J 37/08; B01J 37/00
USPC ................................. 436/128, 127
See application file for complete search history.

(56) References Cited

U.S. PATENT DOCUMENTS

5,559,275 A * 9/1996 Barger .................... C07C 29/34
568/403

OTHER PUBLICATIONS

Schuyten, Stephen J., Activity and In-Situ XAS Studies of Promoted Copper and Zinc Oxide Catalysts for Hydrogen Productin by Methanol Partial Oxidation, Feb. 2008, University of Notre Dame, pp. 1-248.*
Liang, Hongying et al., Aqueoud co-precipitation of Pd-doped cerium oxide nanoparticles: chemistry, structure, and particle growth, J Mater Sci, 2012, 47, pp. 299-307.*
STN Search Report for U.S. Appl. No. 13/950,084 obtained on May 27, 2015. pp. 1-74.*

* cited by examiner

*Primary Examiner* — Christine T Mui
(74) *Attorney, Agent, or Firm* — Geeta Kadambi; Riddhi IP LLC

(57) ABSTRACT

The present invention relates to a novel catalyst and a process for a photo-catalytic degradation of ether-based contaminants such as methyl tertiary-butyl ether (MTBE) in water using a visible light source. The catalyst composition demonstrated complete degradation of MTBE at a room temperature in a photo-catalytic reaction conducted using a visible light source.

16 Claims, 6 Drawing Sheets

METHOD OF PHOTOCATALYTIC DEGRADATION OF CONTAMINANT IN WATER USING VISIBLE LIGHT SOURCE

FIELD OF TECHNOLOGY

The disclosure generally relates to a novel composition of a catalyst and a method of using the catalyst for a photo-catalytic degradation of ether-based compounds in water. More specifically, the present invention relates to a novel composition of a nano zinc oxide photo-catalyst and its use for a photo-catalytic degradation of methyl tertiary-butyl ether (MTBE) in contaminated water using visible light.

BACKGROUND

Methyl tertiary-butyl ether (MTBE) was originally licensed as a motor fuel additive replacing lead as lead is known to accumulate in the environment and affect human health. The increase use of MTBE lead to its increased release to the surface and ground waters in a number of ways; for example through leaking of petrol storage, from spills, emissions from marine engines, from air deposition etc. Further, MTBE is highly soluble in water, resist biodegradation, moves rapidly with groundwater and does not adsorb easily to soil particles. Thus, increase use and characteristics of MTBE lead to MTBE being considered a contaminant in water and soil. Various treatment methods for removing contaminants from water involve adsorption on activated carbon, stripping with air, sterilization by chlorination or ozonization. All of these methods however has some limitations for the removal of tough contaminants such as MTBE.

Photo-catalytic degradation of contaminants by the action of UV light is becoming more popular technique for water purification. The process include generation of a photo-catalyst or use of a known photo-catalyst to photo-catalyze the contaminants for its partial or complete degradation into simple substances such as water, carbon dioxide and possibly mineral acid. A number of issued patents and patent applications disclose different methods for the degradation of MTBE. U.S. Pat. No. 6,468,434 to Pappa et al., describes a method that involves $TiO_2$, a well-known semiconductor metal oxide catalyst, a mineral acid (sulfuric acid) and UV light under pressurized oxygen atmosphere to degrade MTBE.; U.S. Pat. No. 7,341,863 to Vandenbergh describes a method of degradation of MTBE and tertiary-butyl alcohol (TBA) using a mixture bacteria (*Pseudomonas putida*) in contaminated water and/or soil; U.S. Pat. No. 6,197,206 to Wasinger describes a method for removing MTBE from contaminated water by using an oxidizing gas such as ozone or ozone enriched fluid and then stripping the oxidized products. Further studies by Eslami et al (1) also reported a $ZnO/H_2O_2$ system for photocatalytic degradation of MTBE in presence of UV light.

However, there is still a lack of a simple and a cost-effective method of a photo-catalytic degradation of contamination in water and soil.

SUMMARY

The present invention discloses a catalyst composition and a process of using the catalyst for a photo-catalytic degradation of an environmental contaminant in water. Further, the present invention relates to a preparation of a catalyst for a photo-catalytic degradation of an environment contaminant in water. In one embodiment, the present invention discloses a preparation of a metal oxide catalyst for a photo-catalytic degradation of MTBE in water using a visible light source. In another embodiment, the present invention discloses a preparation of a nano-ZnO catalyst for a photo-catalytic degradation of MTBE in water using visible light source.

In one embodiment, a novel composition of a nano zinc oxide (nano-ZnO) catalyst is disclosed. In another embodiment, a novel composition of a nano-ZnO catalyst by a precipitation method is disclosed. The method as disclosed comprise of mixing a zinc nitrate hexahydrate and an ammonium carbonate to form an aqueous solution. The aqueous solution as formed is mixed in molar ratios by continuously stirring at a room temperature. The mixing results in a formation of a precipitate. The precipitate thus formed is separated by centrifugation. The prepared precipitate is a precursor of ZnO. The precipitate is thoroughly washed with a de-ionized water followed by washing with an ethanol solution. The precipitate or the precursor of ZnO is dried in air to form a dried precipitate. The dried precipitate is subjected to a calcination process to form a nano-ZnO catalyst.

In one embodiment, the zinc nitrate hexahydrate and ammonium carbonate are mixed in pre-determined ratios to form an aqueous solution. In another embodiment, the zinc nitrate hexahydrate and ammonium carbonate are mixed in molar ratios to form an aqueous solution. In one embodiment, the aqueous solution of zinc nitrate hexahydrate and ammonium carbonate are mixed by continuously stirring for a pre-determined time at a room temperature whereas in another embodiment, the zinc nitrate hexahydrate and ammonium carbonate are mixed by continuously stirring for time ranging between 1 hr to 3 hrs preferably 2 hrs. The room temperature may vary from 20° C. to 29° C. In one embodiment, the prepared precipitates are dried in air at a pre-determined temperature for a pre-determined time. In another embodiment, the prepared precipitates are dried in air at a temperature ranging from 80° C. to 150° C. preferably 100° C. for overnight. In one embodiment, a process of calcining of a dried precipitate in carried at a temperature range of 400° C. to 600° C. for 4 to 8 hrs to obtain a nano-ZnO catalyst. In another embodiment, a process of calcining of a dried precipitate in carried at a temperature of 500° C. for 6 hrs to obtain a nano-ZnO catalyst.

In most embodiment, a method comprising: mixing a zinc nitrate hexahydrate and an ammonium carbonate to form a solution; stirring the solution to form a precipitate; separating the precipitate by centrifugation; washing the precipitate with a de-ionized water followed by washing with an ethanol; drying the precipitate to form a dried precipitate; and calcining the dried precipitate to form a nano-zinc oxide catalyst.

In most embodiments, a method of using the nano-ZnO catalyst for a photo-catalytic degradation of an ether based contaminant such as MTBE in water is disclosed.

In one embodiment, a process comprising: fitting a cooling jacket to a photochemical reactor; adding, a synthesized catalyst, a distilled water and a contaminant to form a solution; stirring the solution without exposing the solution to any radiation source; loading the solution onto a photochemical reactor; collecting a sample from the solution; designating the sample as an initial concentration of a contaminant; passing an inert gas such as an oxygen gas from an inlet tube through the solution and collecting the next sample from the solution; removing the oxygen inlet tube; exposing the solution to a visible light source by switching ON a visible light lamp; collecting the consecutive samples at a regular interval and estimating an amount of the contaminant in the collected samples to study a photo-catalytic degradation of contaminant by the synthesized catalyst is disclosed.

In another embodiment, a process comprising: fitting a cooling jacket to a photochemical reactor; adding, a nano-ZnO catalyst, a distilled water and MTBE to form a solution; stirring the solution without exposing the solution to any radiation source; loading the solution onto a photochemical reactor; collecting a sample from the solution; designating the sample as an initial concentration of MTBE; passing an inert gas such as an oxygen gas from an inlet tube through the solution and collecting the next sample from the solution; removing the oxygen inlet tube; exposing the solution to a visible light source by switching ON a visible light lamp; collecting the consecutive samples at a regular interval and estimating an amount of MTBE in the collected samples to study a photo-catalytic degradation of MTBE by the nano-ZnO catalyst is disclosed.

In one embodiment, a collected sample is characterized by a gas chromatography to determine a concentration of a contaminant. In another embodiment, a collected sample is characterized by a gas chromatography equipped with a flame ionization detector to determine a concentration of a contaminant such as MTBE. The samples as collected may also be characterized by other methods and instruments known in the art.

In one embodiment, a photochemical reactor has two side arm fitted with a cooling jacket. In another embodiment, the photochemical reactor has two side arm quartz fitted with a cooling jacket. The cooling jacket as stated has a cooling water system running throughout the photo-catalytic degradation process or for a definite time depending on the experimental setup. The temperature of water running in the cooling jacket is set between 10° C. to 40° C. preferably 25° C. using a thermostatic water circulating bath or other desired means of reaching and maintaining a pre-determined temperature of cooling water in the cooling jacket.

In most embodiments, a visible light lamp is fitted with a long Teflon tube and is inserted into the solution in the photochemical reactor during the photo-catalytic degradation process. The photochemical reactor is covered with an aluminum foil every time the visible light lamp is switched ON and the aluminum foil covering is removed every time the visible light lamp is switched OFF. In one embodiment, an inert gas is passed into the solution at an appropriate rate and for a specific time during a photo-catalytic degradation process. In preferred embodiment, an oxygen gas is passed into the solution at a rate of 50 cc/min for 30 min. during the photo-catalytic degradation process. Oxygen gas may also be bubbled into a photochemical reactor at a rate of about 20 cc/min to 100 cc/minute for a period ranging from 20 min to 1 hour with continuous stirring.

In one embodiment, the catalyst is added before the visible light lamp is switched ON whereas in another embodiment, the catalyst is added after the visible light lamp is switched ON and the solution is exposed to the visible light for a required period of time.

The novel composition of a catalyst and a method of using the catalyst for a photo-catalytic degradation of MTBE in water using visible light, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the graph and in the accompanying figures like references indicate similar elements and in which FIG. 1 show step wise process for a synthesis of a nano-ZnO catalyst.

Other features of the present embodiments will be apparent from the accompanying detailed description that follows.

DETAILED DESCRIPTION

The present disclosure relates to a novel composition of a catalyst and a process of its synthesis. Further, the present disclosure relates to a method of using the synthesized novel catalyst for a photo-catalytic degradation of ether-based contaminant such as MTBE in water and soil using a visible light source.

Synthesis of a Novel Catalyst

Figure 1:
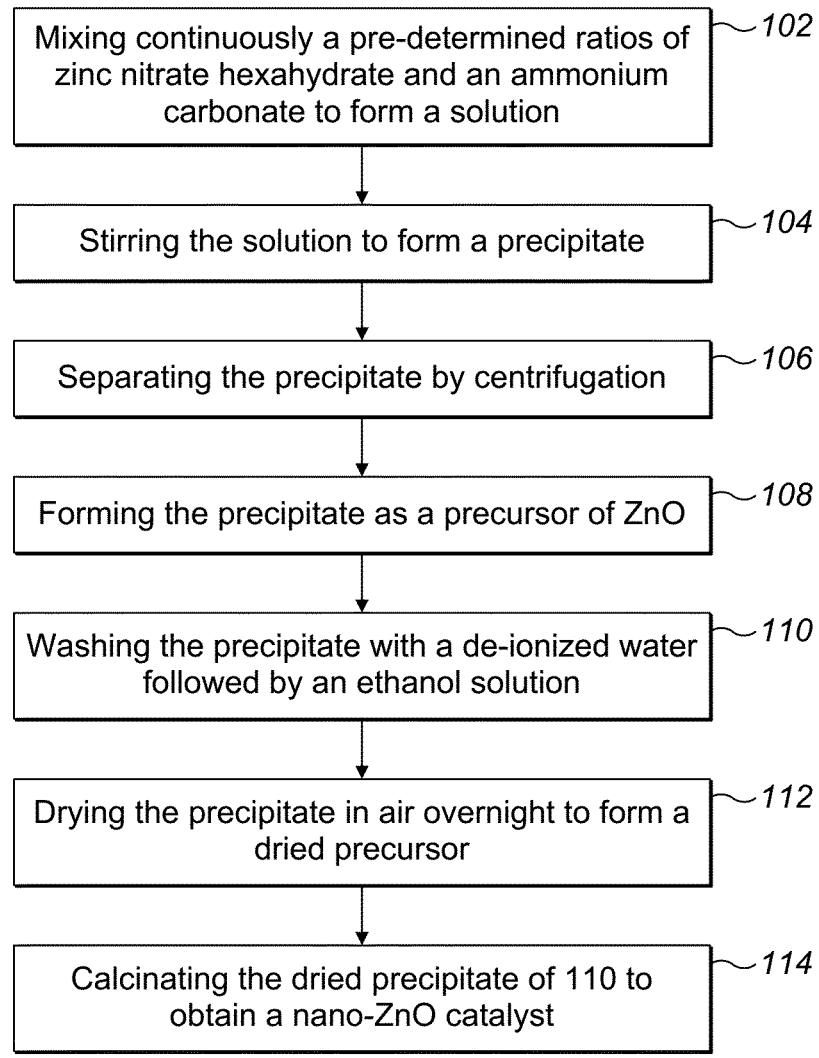

The present disclosure relates to a novel composition of a nano-ZnO catalyst and a process of its synthesis. The catalyst as disclosed is synthesized by a precipitation method. FIG. 1 shows a step-wise process of a synthesis of a nano-ZnO catalyst. The process as disclosed comprise of mixing continuously a pre-determined ratios of a zinc nitrate hexahydrate and an ammonium carbonate to form an aqueous solution 102. The aqueous solution is the stirred at a room temperature for a pre-determined time interval forming a precipitate 104. The precipitate formed is separated from the aqueous solution through centrifugation 106. The precipitate as formed acts as a precursor of ZnO 108. The precipitate is thoroughly washed with a de-ionized water followed by washing with an ethanol solution 110. The precipitate is dried in air at a pre-determined temperature overnight to form a dried precipitate 112. The dried precipitate is calcined to obtain a nano-ZnO catalyst 114.

The zinc nitrate hexahydrate and the ammonium carbonate may be mixed in equal molar ratios to form an aqueous solution. The aqueous solution of zinc nitrate hexahydrate and the ammonium carbonate is continuously stirred at a room temperature for a time range of 1-4 hours preferably 2 hours. The room temperature may vary from 20° C. to 29° C. The precipitate is dried in air at a temperature of 100° C. overnight. A user may dry the precipitate at other temperature ranging from 80° C. to 150° C. Further, the dried precipitate is subjected to calcination to form a nano-ZnO catalyst. The calcination as disclosed is done at a temperature of 500° C. for 6 hours. The calcination of the dried precipitate may also be done at a temperature range of 300° C. to 700° C. for 4 to 8 hours to obtain a nano-ZnO catalyst.

Thus, the steps of a synthesis of a nano-ZnO catalyst comprise of mixing a molar ratio of a zinc nitrate hexahydrate and an ammonium carbonate to form an aqueous solution; stirring the aqueous solution continuously at a room temperature to form a precipitate; separating the precipitate by centrifugation; washing the precipitate with a de-ionized water followed by washing with an ethanol solution; drying the precipitate in air overnight to form a dried precipitate; calcinating the dried precipitate to obtain a nano-ZnO catalyst.

The catalyst as synthesized above was further characterized using an advance instrumentation techniques such as a XRD diffractometer, Scanning electron microscopy (SEM) and Transmission electron microscopy (TEM) studies.

Figure 2:
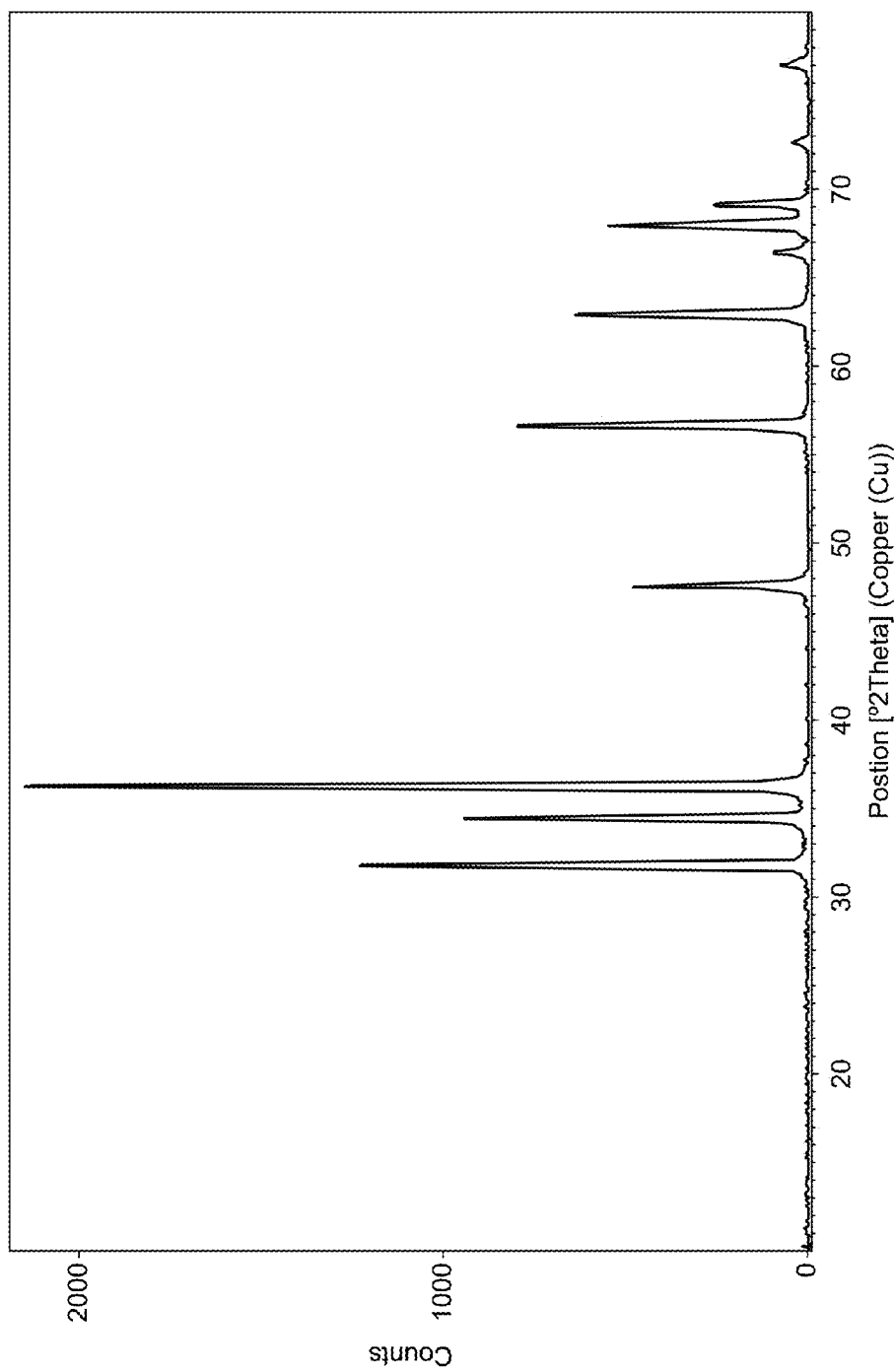
FIG. 2 shows a XRD diffractogram of nano-ZnO catalyst.

FIG. 2 shows a result of a characterization of a nano-ZnO catalyst using a XRD diffractometer. The crystalline structure of the nano-ZnO catalyst was characterized by a rotating-target X-ray diffractometer (Japan Rigaku D/Max-2400) equipped with a monochromatic high-intensity Cu K radiation (=1.5418 Å, 40 kV, 100 mA). The characteristic strong diffraction peaks obtained for the nano-ZnO catalyst are given in FIG. 2.

Figure 3:
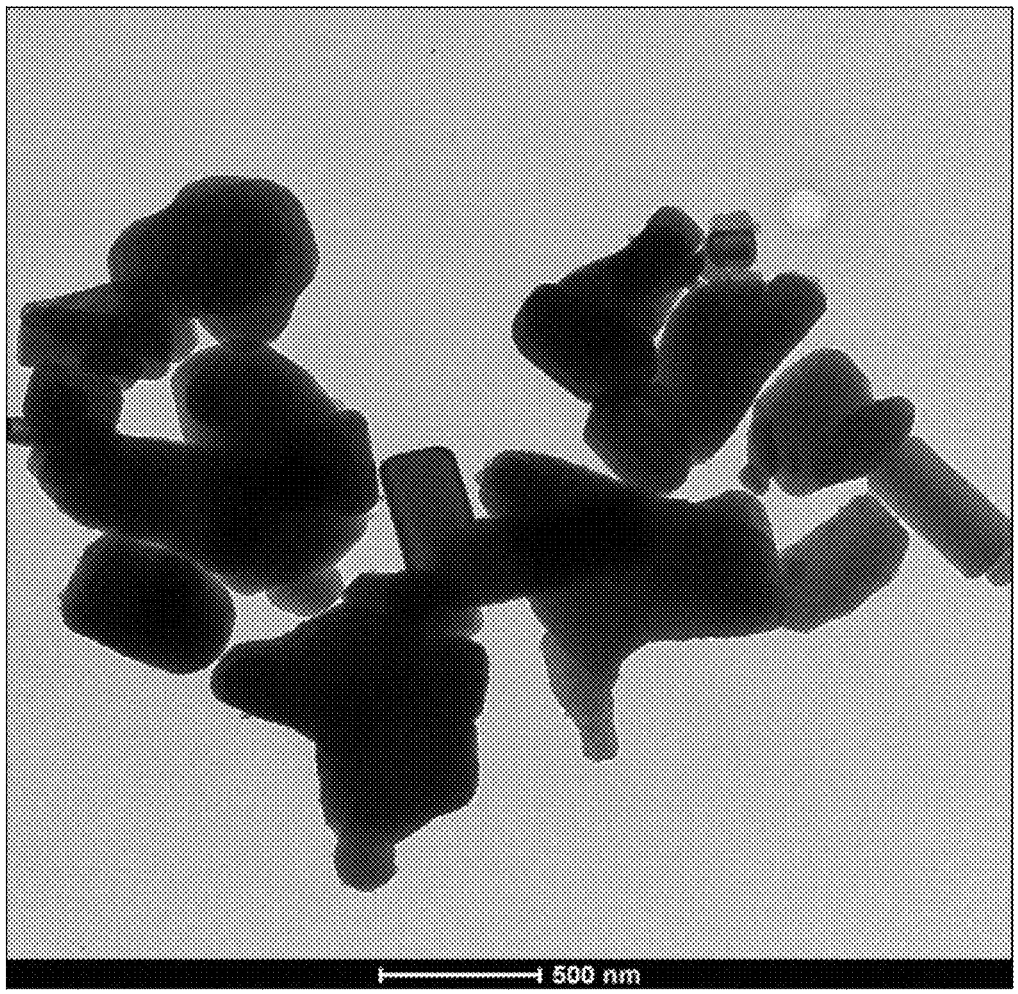
FIG. 3 shows a TEM image of nano-ZnO catalyst.
Figure 4:
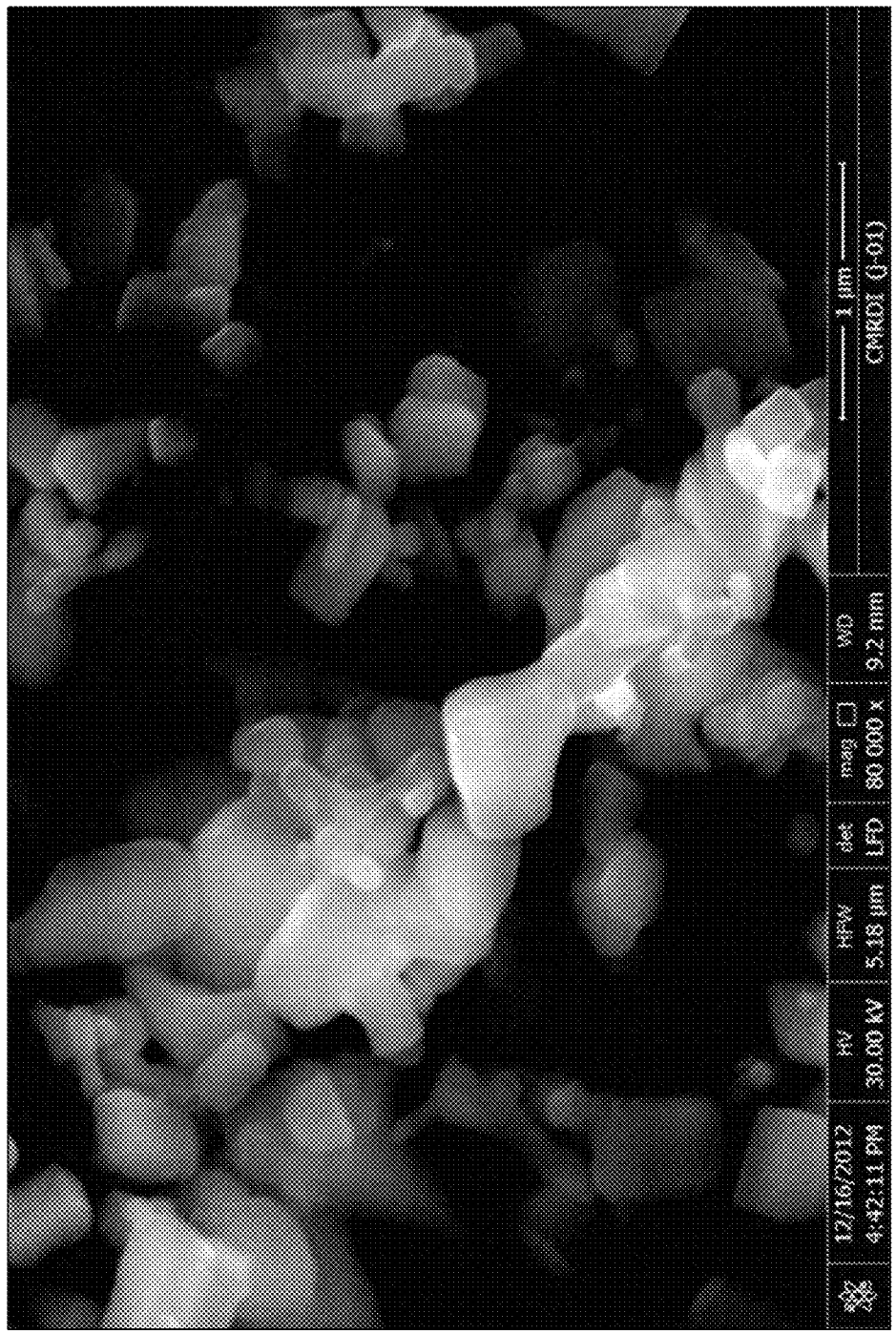
FIG. 4 shows a SEM micrograph of nano-ZnO catalyst.

As shown in FIG. 3, the morphology of disclosed and synthesized catalyst (nano-ZnO) is observed by TEM studies as well as by SEM studies as shown in FIG. 4.

Photo-Catalytic Degradation of Ether-Based Compounds Such as a MTBE in Water

Photo-catalytic degradation is a simple and promising technique for solving environmental pollution issues. Photo-catalytic reaction is initiated by the irradiation of a catalyst with light of a sufficient energy to excite an electron from valence band of the catalyst to conduction band. When electron leaves its valence band to conduction band it creates a hole in the valence band, therefore, electron-hole pair is generated as a result of photo-excitation and reacts with hydroxyl ions/oxygen/water to produce hydroxyl (.OH) radicals. These hydroxyl (.OH) radicals react with the organic molecules adsorbed on the catalyst and degrade them to $CO_2$ and $H_2O$ through a series of possible chemical reactions.

Photo-catalytic degradation of MTBE has been performed many a times in past. A paper by Eslami, et al (1) reported $ZnO/H_2O_2$ system for a photo-catalytic degradation of MTBE in the presence of UV light. However, the present disclosure report a synthesis and a use of a novel composition of a nano-ZnO catalyst for the photo-catalytic degradation of MTBE in water in the presence of visible light instead of UV light and without any additional chemicals for reaction such as $H_2O_2$. Further, a paper by Yadollah et al (2) reported a use of ZnO for a photo-catalytic degradation of m-cresol in the presence of a visible light source. However, the present invention discloses the use of the nano-ZnO catalyst for the photo-catalytic degradation of MTBE in the presence of the visible light. m-Cresol and MTBE are two different classes of organic compounds with different properties and use. Also, the ZnO as used in the studies Yadollah is crude ZnO powder whereas the present disclosure is a novel composition of nano-ZnO catalyst which also comprise of calcinating the precursor of catalyst.

The studies of Dindar et al (3) reports a photo-degradation capacity of $TiO_2$ as compared to ZnO and $Fe_2O_3$ using a sodium lamp under direct sunlight and found the use of ZnO as a solar photo-catalyst for degradation of organics in aqueous solution. However, the ZnO reported in these studies works in concentrated light which is not same as in the present application. Visible light is not concentrated in the present disclosure.

The studies of Sahle-Demessie et al (4) reported the use of $TiO_2$ as a photo-catalyst for the degradation of MTBE in the presence of sunlight. Further, they have reported that solar degradation is a low-cost and effective alternative to degrade MTBE in water. However, ZnO is a better photo-catalyst as compared to $TiO_2$ as ZnO absorb more radiations which causes complete degradation of MTBE in water in the presence of the visible light.

U.S. Pat. No. 6,468,434 to Pappa et al., describes a photo-degradative process for the purification of water contaminated by ether-based compounds, especially MTBE using TiO2 as preferred catalyst with UV light source. However, ZnO is a better alternative for the photo-catalytic degradation of MTBE in water as ZnO absorb more radiation and has worked very efficiently to completely degrade MTBE under visible light which is a much more convenient and cheaper light source as compared to UV-light source.

U.S. Pat. No. 8,361,324 to Bagabas et al., describes a well-controlled synthesis process and an economical use of ZnO in photo-catalytic degradation of contaminant such as cyanide ions in water and soil under UV-light source. However, the composition and synthesis of a nano-ZnO catalyst as is disclosed in the preset application is different. Further, the nano-ZnO catalyst is used for the photo-catalytic degradation of MTBE and not cyanide.

Thus, a number of studies have been reported and published disclosing a photo-catalytic degradation of ether-based contaminants such as MTBE in water. However, contrary to those studies the present application discloses a novel composition and a synthesis process of a nano-ZnO catalyst and further a use of the catalyst for the photo-catalytic degradation of an ether-based compound such as MTBE in contaminated water under visible light. ZnO posses remarkable property of absorbing more radiations as compared to other metal oxide such as $TiO_2$, $Fe_2O_3$ etc. The use of visible light makes the photo-catalytic degradation process very simple, cost-effective and convenient to use. Working with visible light eliminates a need of costly instrumentation and set up as compared to when working with UV-light source. Thus, the present invention combines the unique properties of ZnO with calcination to form a nano-ZnO catalyst and the properties of visible light for the complete degradation of contaminants especially ether-based contaminants such as MTBE in water and soil.

Photo-catalytic degradation of MTBE is carried out within a photochemical reactor. The photochemical reactor as disclosed is a double sided arms quartz photochemical reactor. The photochemical reactor is further fitted with a cooling jacket which runs cooling water throughout an experiment or for a prescribed time depending on the experimental conditions. The temperature of the cooling water system is set at 25° C. using a thermostatic water circulating bath. The temperature of the cooling water system may be set 10° C. above or 10° C. below 25° C. depending on the experimental conditions. The photochemical reactor further comprises of a visible lamp fitted with a teflon tube which is inserted into a solution during the photo-catalytic degradation process. The photochemical reactor further comprises of an oxygen gas inlet tube. The tube provides the necessary oxygen gas to pass through the solution. The oxygen gas may be passed at a rate ranging from 30 cc/min to 100 cc/min preferably, 50 cc/min through the solution via the inlet tube. Oxygen gas may be passed for 20 min, 25 min, 30 min, 35 min or so on depending on the experimental setup but preferably 30 min.

Figure 5:
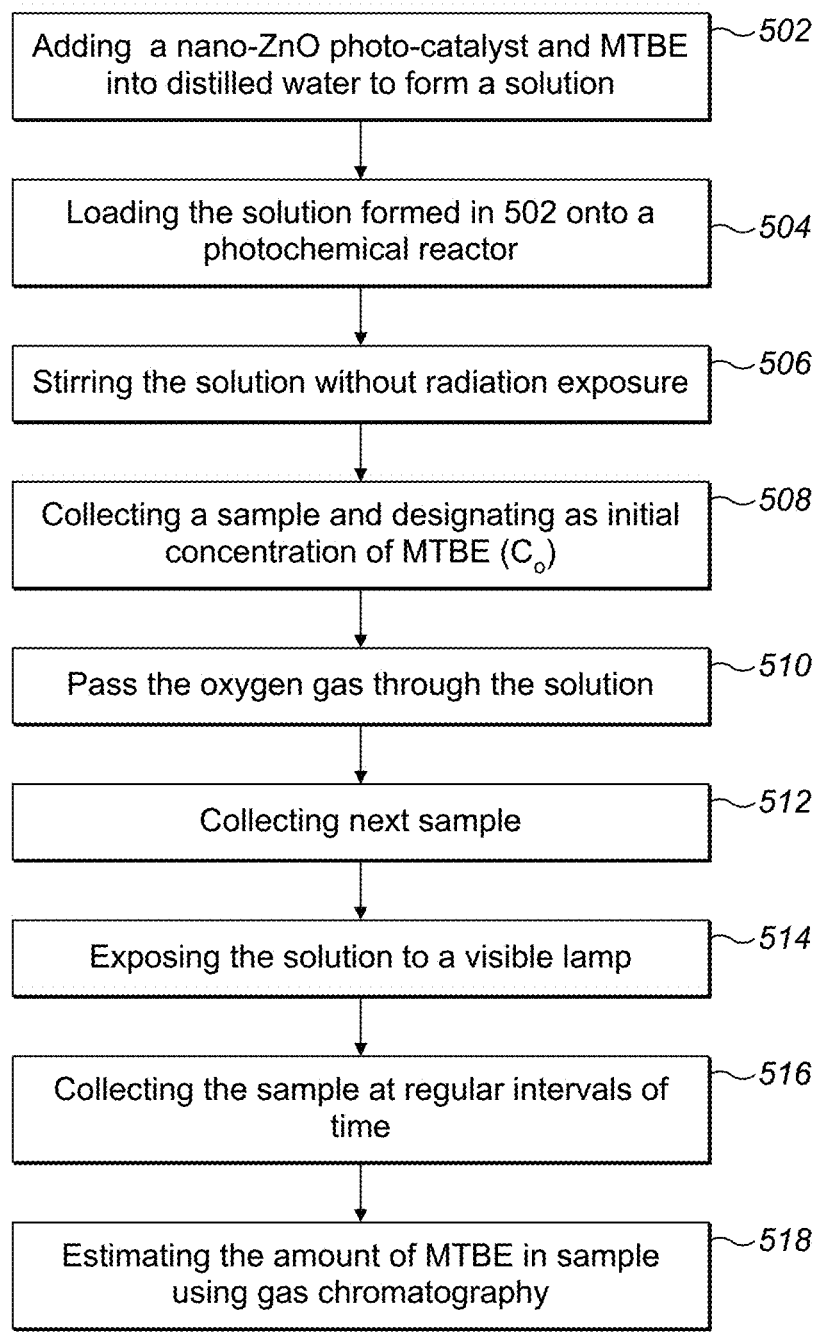
FIG. 5 shows step wise method of using nano-ZnO catalyst for a photo-catalytic degradation of MTBE using visible light.

FIG. 5 shows steps to use the disclosed catalyst for a photo-catalytic degradation of MTBE in water. The steps as disclosed comprise: adding a required amount of nano-ZnO catalyst and contaminant such as a MTBE to form a solution 502. The solution thus formed was loaded onto a photochemical reactor 504. The solution was stirred without a radiation exposure thoroughly to disperse the nano-ZnO catalyst completely into the solution 506. Following this, a liquid sample was collected and designated as an initial concentration of MTBE ($C_o$) 508. Oxygen gas was then passed though the remaining solution through an inlet tube 510. The next sample was collected 512. The oxygen gas through inlet tube was taken out of the photochemical reactor and a visible lamp was powered ON for a particular time period 514. The sample was again collected at a regular interval of time 516 and the amount of MTBE was then calculated using a gas chromatography instrument equipped with a flame ionization detector 518.

The amount of a catalyst and a contaminant added into the photochemical reactor will depend on the experimental setup, design, source of contamination nd other such factors.

A photo-catalytic degradation process using the disclosed photo-catalyst may also be carried out as follows: In a 500 ml two side arms photochemical reactor fitted with a cooling jacket, 500 ml of distilled water, 100 mg of the selected catalyst and a required amount by weight of MTBE were stirred at room temperature without any radiation exposure for a period of 30 min to have a complete dispersion of the photo-catalyst in the solution and a liquid sample was collected to be designated as initial concentration of MTBE ($C_o$). Then, a current of oxygen gas with a rate of 50 cc/min was passed through the solution via inlet tube for 30 min and a next sample was collected. The oxygen gas inlet tube was then removed and a visible lamp was switched-ON and the photochemical reactor was covered with aluminum foil. Sample was collected after every 1 h from starting the visible lamp ON up till 5 hours. The photochemical reactor is covered with an aluminum foil for the entire duration of visible light exposure ad is removed when visible light is switched OFF.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

EXAMPLES

The present embodiments are being described with reference to specific example embodiments and are included to illustrate but not limit the scope of the invention.

Example 1

In the present experiment, no catalyst was used to investigate the effect of only visible light on the photo-catalytic degradation of MTBE in water. A solution of 100 ppm by weight of MTBE was placed in a photochemical reactor. The solution was stirred at room temperature without any radiation exposure for a period of 30 min and a liquid sample was collected to be designated as initial concentration of MTBE ($C_o$). Then, a current of oxygen gas with a rate of 50 cc/min was passed through the solution via an inlet tube for 30 min and a next sample was collected. The oxygen gas inlet tube was then removed and a visible light lamp was switched-ON. The photochemical reactor was covered with aluminum foil for the entire duration of visible light exposure. Samples were collected every 1 h after starting the visible lamp ON for a total photo-catalytic degradation period of 5 hours or may be more.

Figure 6:
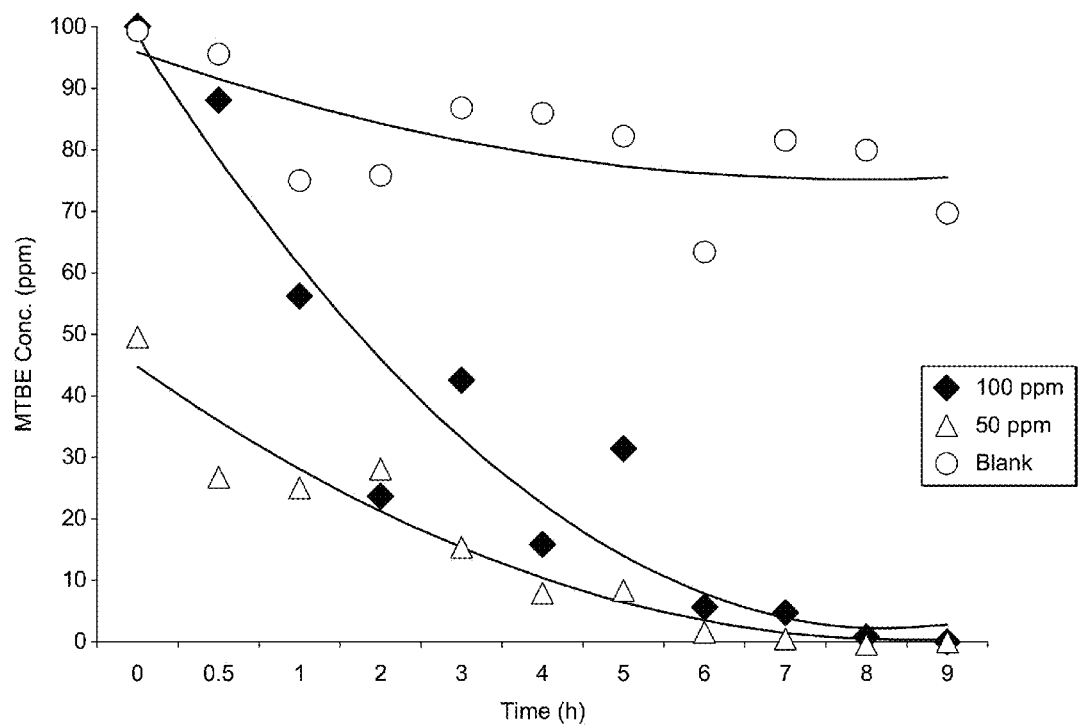
FIG. 6 shows reaction kinetics of photo-catalytic degradation of MTBE in water in presence of nano-ZnO catalyst.

Following the collection of samples, the concentration of MTBE in a sample was measured with a gas chromatograph equipped with a flame ionization detector (FID). The results are plotted in FIG. 6. The results show negligible degradation of MTBE with no added catalyst.

Example 2

In the present experiment, 50 ppm by weight of nano-ZnO catalyst was used to investigate the photo-catalytic degradation of MTBE in water under visible light. A solution comprising 100 ppm by weight of MTBE and 50 ppm of nano-ZnO catalyst was placed in a photochemical reactor. The solution was stirred at room temperature without any radiation exposure for a period of 30 min and a liquid sample was collected to be designated as initial concentration of MTBE ($C_o$). A current of oxygen gas with a rate of 50 cc/min was then passed through the solution via the inlet tube for 30 min and a next sample was collected. The oxygen gas inlet tube was then removed and a visible light lamp was switched-ON. The photochemical reactor was covered with aluminum foil for the entire duration of visible light exposure. Samples were collected every 1 h after starting the visible lamp ON for a total photo-catalytic degradation period of 5 hours or may be more.

Following which the concentration of MTBE in the sample was measured with a gas chromatograph equipped with a flame ionization detector (FID). The results are plotted in FIG. 6. The results show some degradation of MTBE during 5 hours of visible light exposure with a 50 ppm by weigh of the catalyst.

Example 3

In the present experiment, 100 ppm by weight of nano-ZnO catalyst was used to investigate the photo-catalytic degradation of MTBE in water under visible light. A solution comprising a 100 ppm by weight of MTBE and 100 ppm of nano-ZnO catalyst was placed in a photochemical reactor. The solution was stirred at room temperature without any radiation exposure for a period of 30 min and a liquid sample was collected to be designated as initial concentration of MTBE ($C_o$). A current of oxygen gas with a rate of 50 cc/min was passed through the solution via inlet tube for 30 min and a next sample was collected. The oxygen inlet tube was then removed and a visible lamp was switched-ON. The photochemical reactor was covered with aluminum foil for the entire duration of visible light exposure. Samples were collected every 1 h after starting the visible lamp ON for a total photo-catalytic degradation period of 5 hours or may be more. Following which the concentration of MTBE in the sample was measured with a gas chromatograph equipped with a flame ionization detector (FID). The results are plotted in FIG. 6. The results show complete degradation of MTBE during 5 hours of visible exposure with a 100 ppm by weight of the catalyst.

INDUSTRIAL APPLICABILITY

This invention provides a useful catalyst composition and process for the removal of MTBE from ground water via photocatalytic degradation process employing visible light source. The catalyst disclosed in this process can be reused after simple regeneration process of drying and heating in air at 450° C. The catalys, and the MTBE removal process can be implemented in nature using the visible range of the sunlight.

What is claimed is:
1. A method, comprising:
mixing a zinc nitrate hexahydrate and an ammonium carbonate to form a solution;
stirring the solution to form a precipitate;
separating the precipitate by centrifugation;
washing the precipitate with a de-ionized water followed by washing with an ethanol;
drying the precipitate to form a dried precipitate; and
calcining the dried precipitate to obtain a nano-zinc oxide catalyst.

2. The method of claim 1, wherein mixing of the zinc nitrate hexahydrate and the ammonium carbonate to form the solution is a continuous mixing process carried at 25° C. for a period of 2 hours.

3. The method of claim 1, wherein the precipitate is a precursor of a nano-zinc oxide catalyst.

4. The method of claim 1, wherein the precipitate is dried in air at 100° C. to form a dried precipitate.

5. The method of claim 1, wherein calcining of the dried precipitate is carried at 500° C. for 6 hours to obtain a nano-zinc oxide catalyst.

6. The method of claim 1, wherein the nano-zinc oxide catalyst is used for a photo-catalytic degradation of an ether based compound in water.

7. The method in claim 6, wherein the ether based compound is Methyl tertiary butyl ether (MTBE).

8. A process, comprising:
   fitting a cooling jacket to a photochemical reactor;
   adding a nano-ZnO catalyst, a distilled water and a contaminant to form a solution;
   stirring the solution without exposing the solution to any radiation source;
   loading the solution onto a photochemical reactor;
   collecting a sample from the solution;
   designating the sample as an initial concentration the contaminant;
   passing an oxygen gas from an inlet tube through the solution;
   collecting the next sample from the solution;
   removing the oxygen inlet tube;
   exposing the solution to a visible light source;
   collecting the samples consecutively at a regular interval of time and estimating of the contaminant in the collected samples to determine a photo-catalytic degradation of the contaminant.

9. The process of claim 8, wherein the contaminant is an ether-based contaminant.

10. The process of claim 9, wherein the ether based contaminant is MTBE.

11. The process of claim 8, wherein an oxygen gas is passed at a rate of 50 cc/min.

12. The process of claim 8, wherein the process is done to study the photo-catalytic degradation of MTBE by a nano-ZnO catalyst.

13. The process of claim 8, wherein the amount of contaminant is estimated by a gas chromatography equipped with a flame ionization detection.

14. A process, comprising:
   fitting a cooling jacket to a photochemical reactor;
   adding a nano-ZnO catalyst, a distilled water and a MTBE to form a solution;
   stirring the solution without exposing the solution to any radiation source;
   loading the solution onto a photochemical reactor;
   collecting a sample from the solution; designating the sample as an initial concentration of the MTBE;
   passing an oxygen gas from an inlet tube through the solution;
   collecting the next sample from the solution;
   removing the oxygen inlet tube;
   exposing the solution to a visible light source;
   collecting the samples consecutively at a regular interval of time and estimating of the MTBE in the collected samples to determine photo-catalytic degradation of MTBE.

15. The process of claim 14, wherein the MTBE concentration in collected samples is estimated using a gas chromatography equipped with a flame ionization detection.

16. The process of claim 14, wherein the solution is exposed to a visible light source for the photo-catalytic degradation of MTBE in the presence of the catalyst.

* * * * *